E. M. COLE.
AGITATING DISK FOR PLANTERS.
APPLICATION FILED NOV. 3, 1913.
1,104,246.
Patented July 21, 1914.
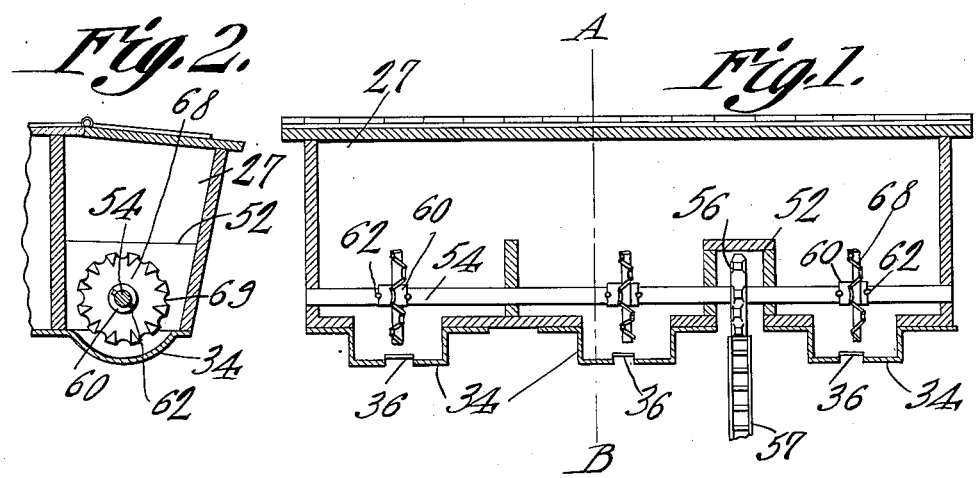
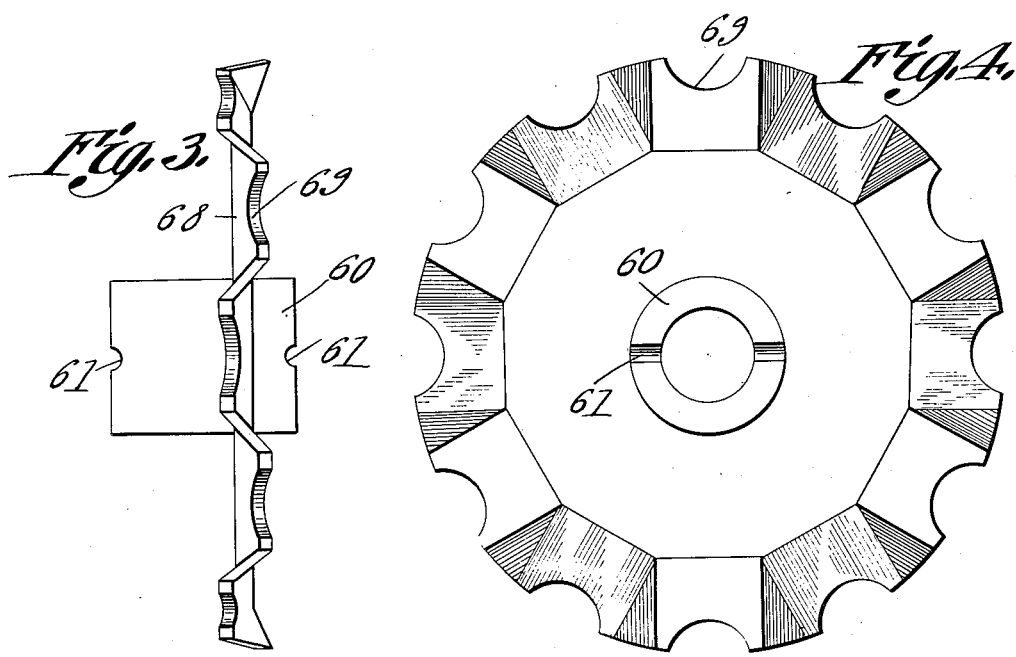
Witnesses
E. M. Cole,
Inventor
by
Attorneys

UNITED STATES PATENT OFFICE.

EUGENE MACON COLE, OF CHARLOTTE, NORTH CAROLINA.

AGITATING-DISK FOR PLANTERS.

1,104,246.  Specification of Letters Patent.  Patented July 21, 1914.

Original application filed December 7, 1912, Serial No. 735,519. Divided and this application filed November 3, 1913. Serial No. 799,019.

*To all whom it may concern:*

Be it known that I, EUGENE M. COLE, a citizen of the United States, residing at Charlotte, in the county of Mecklenburg and State of North Carolina, have invented a new and useful Agitating-Disk for Planters, of which the following is a specification.

This invention relates to planters and more particularly to agitating means whereby the oats, wheat or other like seeds to be planted will be thoroughly agitated in the hopper containing them and will be conveyed positively to the outlet openings provided therefor.

A further object is to provide means whereby said agitating means may be securely attached to a shaft.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a vertical transverse section through a hopper having the present improvements combined therewith. Fig. 2 is a section on line A—B Fig. 1. Fig. 3 is an edge view of one of the agitating disks. Fig. 4 is a face view thereof.

The present invention constitutes a division of an application filed by me on December 7, 1912, Serial No. 735,519.

In the drawings herein referred to, a hopper for containing oats, wheat or the like, has been indicated at 27 and the bottom of the hopper is formed with a desired number of concaves 34 in which are formed outlet openings 36.

As shown in Fig. 1, a portion of the bottom of receptacle 27 is elevated, as at 52 and extending under this elevated portion 52 but over the remaining portions of the bottom of the casing 27 is a shaft 54. A sprocket 56 is secured to the shaft and arranged under the elevated portion 52 of the bottom of casing 27. This sprocket is engaged by a chain 57 which extends downwardly to suitable driving mechanism, not shown. The shaft 54 is provided, above each of the concaves 34 with an agitating disk 68 having a fluted peripheral portion, as shown particularly in Fig. 3, there being a plurality of radial notches 69 within the disk. The hub 60 of each disk has diametrically opposed notches 61 in each end thereof adapted to receive holding pins 62 extending through the shafts 54. These pins thus serve not only to hold the disks 68 against rotation on the shaft 54, but also prevent the disks from shifting longitudinally of the shaft.

It will be apparent that when shaft 54 is rotated, the disk 68 will operate to force downwardly that portion of the grain seated in the pockets formed by the waved or fluted edge portions of the disk. It has been found that a disk such as described is particularly designed for use in connection with oats as it has heretofore been a difficult matter to agitate and feed the oats in the manner desired.

What is claimed is:—

1. In a machine of the class described, the combination with a receptacle having an outlet, and a shaft mounted for rotation within the receptacle, of agitating means including a disk having its marginal portion offset beyond opposite portions of the disk alternately to form pockets at each side of the disk, each pocket having its end walls converging inwardly, a hub having diametrically opposed notches in the ends thereof, and a coupling pin extending through the shaft and seated in the notches to hold the hub against rotation upon the shaft and against longitudinal movement relative thereto.

2. The combination with a receptacle having an outlet in the bottom thereof, of agitating means mounted for rotation above the outlet opening and including a shaft, a disk secured to the shaft and having its marginal portion offset laterally in opposite directions successively to form an annular series of pockets at each side of the disk, the end walls of each pocket converging inwardly, each of said pockets being formed with a notch in its outer end and between said end walls.

In testimony that I claim the foregoing as my own, I have hereto affixed my signature in the presence of two witnesses.

EUGENE MACON COLE.

Witnesses:
 SELINA WILSON,
 I. E. SIMPSON.